(12) United States Patent
Sprickmann Kerkernick et al.

(10) Patent No.: US 9,662,978 B2
(45) Date of Patent: May 30, 2017

(54) METHOD FOR REPRODUCING INFORMATION IN A MOTOR VEHICLE, AND MOTOR VEHICLE DESIGNED TO CARRY OUT THE METHOD

(71) Applicants: AUDI AG, Ingolstadt (DE); VOLKSWAGEN AG, Wolfsburg (DE)

(72) Inventors: Paul Sprickmann Kerkernick, Ingolstadt (DE); Lennart Bendewald, Wolfsburg (DE); Armin Sebbesse, Braunschweig (DE); Michael Mischke, Berlin (DE); Philip Rigley, Ingolstadt (DE); Stefan Mayer, Gaimersheim (DE); Carl Aron Carls, Hassmoor (DE); Michael Wittkämper, Braunschweig (DE)

(73) Assignees: AUDI AG, Ingolstadt (DE); VOLKSWAGEN AG, Wolfsburg (DE)

(*) Notice: Subject to any disclaimer, the term of this patent is extended or adjusted under 35 U.S.C. 154(b) by 0 days.

(21) Appl. No.: 14/384,344

(22) PCT Filed: Mar. 14, 2013

(86) PCT No.: PCT/EP2013/000785
§ 371 (c)(1),
(2) Date: Sep. 10, 2014

(87) PCT Pub. No.: WO2013/139456
PCT Pub. Date: Sep. 26, 2013

(65) Prior Publication Data
US 2015/0046028 A1    Feb. 12, 2015

(30) Foreign Application Priority Data
Mar. 22, 2012 (DE) .......... 10 2012 005 858

(51) Int. Cl.
*B60K 35/00* (2006.01)
*G02B 27/01* (2006.01)

(52) U.S. Cl.
CPC .............. *B60K 35/00* (2013.01); *G02B 27/01* (2013.01); *B60K 2350/1096* (2013.01);
(Continued)

(58) Field of Classification Search
CPC ........ B60K 2350/352; B60K 2350/901; B60K 2350/903; B60K 2350/1096;
(Continued)

(56) References Cited

U.S. PATENT DOCUMENTS

| | | | |
|---|---|---|---|
| 4,924,957 A | 5/1990 | Gigla | |
| 6,750,832 B1 * | 6/2004 | Kleinschmidt | ................ 345/7 |

(Continued)

FOREIGN PATENT DOCUMENTS

| | | |
|---|---|---|
| CN | 1726418 | 1/2006 |
| CN | 101379429 | 3/2009 |

(Continued)

OTHER PUBLICATIONS

International Search Report issued by the European Patent Office in International Application PCT/EP2013/000785 on Jul. 8, 2013.
(Continued)

*Primary Examiner* — Adam Tissot
*Assistant Examiner* — Tamara Weber
(74) *Attorney, Agent, or Firm* — Henry M. Feiereisen LLC

(57) ABSTRACT

A method for reproducing information in a motor vehicle (1), said information being assigned to classes of information and being presented on a display (2, 7), wherein the information is reproduced on a base display (9) arranged at the base of the windshield, Wherein each class of information is assigned a sub-area of the base display (9), and the
(Continued)

information is reproduced in the sub-area (18, 19, 20) corresponding to the class of information assigned to the information to be displayed.

7 Claims, 1 Drawing Sheet

(52) U.S. Cl.
 CPC ..... *B60K 2350/2052* (2013.01); *B60K 2350/352* (2013.01); *B60K 2350/901* (2013.01); *B60K 2350/903* (2013.01)

(58) Field of Classification Search
 CPC .... B60K 2350/2052; B60K 35/00; B60K 37/00; G02B 27/01; G02B 27/0101; G02B 27/0141; G06F 3/017; G06F 17/00; G09G 5/00
 See application file for complete search history.

(56) References Cited

U.S. PATENT DOCUMENTS

| | | | | |
|---|---|---|---|---|
| 7,302,322 | B1* | 11/2007 | Szczerba et al. | 701/34.4 |
| 7,764,247 | B2* | 7/2010 | Blanco et al. | 345/7 |
| 8,412,413 | B1* | 4/2013 | Stark et al. | 701/36 |
| 2005/0154505 | A1* | 7/2005 | Nakamura et al. | 701/1 |
| 2005/0278113 | A1* | 12/2005 | Maruyama et al. | 701/208 |
| 2006/0284839 | A1* | 12/2006 | Breed | B62D 1/046 345/156 |
| 2007/0265745 | A1* | 11/2007 | Styles | B60H 1/00985 701/36 |
| 2009/0225434 | A1* | 9/2009 | Nicholas et al. | 359/630 |
| 2010/0030568 | A1* | 2/2010 | Daman | 705/1 |
| 2010/0321170 | A1* | 12/2010 | Cooper et al. | 340/425.5 |
| 2011/0122101 | A1* | 5/2011 | Kurozuka | 345/204 |
| 2011/0140873 | A1* | 6/2011 | Stahlin | B60K 37/06 340/438 |
| 2012/0050139 | A1* | 3/2012 | Wang et al. | 345/7 |
| 2013/0076615 | A1* | 3/2013 | Iao | 345/156 |

FOREIGN PATENT DOCUMENTS

| | | |
|---|---|---|
| CN | 101889234 | 11/2010 |
| DE | 37 21 289 | 1/1989 |
| DE | 41 26 148 | 6/1994 |
| DE | 297 11 094 | 10/1997 |
| DE | 102004031334 | 1/2006 |
| DE | 102007051017 | 3/2009 |
| DE | 102009011075 | 9/2009 |
| DE | 202010013696 | 1/2011 |
| DE | 102010056411 | 6/2012 |
| EP | 2 112 013 | 10/2009 |
| WO | WO 2008/040899 | 4/2008 |
| WO | WO 2012/084123 | 6/2012 |

OTHER PUBLICATIONS

Chinese Search Report issued on Feb. 24, 2016 by the Chinese Patent Office in counterpart Chinese Patent Application No. 201380015739.3.

Translation of Chinese Search Report issued on Feb. 24, 2016 by the Chinese Patent Office in counterpart Chinese Patent Application No. 201380015739.3.

* cited by examiner

METHOD FOR REPRODUCING INFORMATION IN A MOTOR VEHICLE, AND MOTOR VEHICLE DESIGNED TO CARRY OUT THE METHOD

CROSS-REFERENCES TO RELATED APPLICATIONS

This application is the U.S. National Stage of International Application No. PCT/EP2013/000785, filed Mar. 14, 2013, which designated the United States and has been published as International Publication No. WO 2013/139456 A1 and which claims the priority of German Patent Application, Serial No. 10 2012 005 858.6, filed Mar. 22, 2012, pursuant to 35 U.S.C. 119(a)-(d).

BACKGROUND OF THE INVENTION

The invention relates to a method for reproducing items of information in a motor vehicle, with classes of information being associated with the items of information and represented on a display.

Motor vehicles that include different types of assistance systems or information systems, in particular driver assistance systems, navigation systems and/or infotainment systems are known in the art. When operating these assistance systems and navigation systems, items of information are typically reproduced inside the vehicle for informing vehicle occupants.

Advantageously, the display units currently provided for reproduction include liquid crystal display screens, so-called displays. These displays can be used to display a variety of information, in particular state variables of the motor vehicle, such as a vehicle speed, an engine speed and the like. Furthermore, outputs from the navigation system can be displayed, for example in the form of a digital road map. Such displays are typically integrated into a vehicle interior trim, in particular the dashboard. Driver-relevant information is displayed, for example, via a combination instrument that includes one or more displays located behind a steering wheel of the motor vehicle. Motor vehicles are also known, where an additional display is arranged in the region of a center console.

Recently, alternative display concepts for motor vehicles are proposed wherein, for example, driver-relevant information is projected directly onto a windshield of the vehicle. Such display units are provided in particular for displaying status data of the motor vehicle, such as the current vehicle speed.

For example, the publication WO 2008/040899 A1 discloses a display unit having a display area which is disposed in an upper region of the dashboard in the vicinity of a lower boundary of the windshield. The display surface has an opaque coating onto which information is projected with a projector during the operation.

Further, a display unit designed as a liquid crystal display and arranged directly on or in the windshield is known from DE 297 11 094 U1.

Due to the large amount of information that is offered in today's motor vehicles, multiple display units or displays arranged at various locations in the vehicle's interior are often used when representing information. This has the disadvantage that a particular vehicle occupant may not be able to see relevant information for the occupant or the information may be rendered too small, so that for example occupants seated in the rear area of the vehicle are unable to read the information.

SUMMARY OF THE INVENTION

Starting from this prior art, it is therefore an object of the present invention to provide a method for reproducing information in a motor vehicle of the aforementioned type, which provides comprehensive information to the vehicle occupants.

The object is achieved with a method of the aforementioned type, wherein according to the invention, the items of information are reproduced on a display at the base of the windshield, wherein a sub-area of the display at the base of the windshield is assigned to each class of information and the items of information are reproduced in the particular sub-area that corresponds to the class of information associated with the items of information to be displayed or the items of information are reproduced in those sub-areas that correspond to the classes of information associated with the items of information to be displayed.

A base display refers in the following to a display unit that is arranged at a bottom boundary or base of a windshield and hence extends over at least a width of the windshield. The base display preferably includes a liquid crystal display (LCD) or an OLED display in form of a ribbon. In an alternative embodiment, the base display is designed as a projection display. Due to its large area, the base display can be used to particularly clearly display and reproduce items of information.

The base display preferably extends over at least half the width of the windshield. In a particularly preferred embodiment, the base display extends over 50% to 70% of the width of the windshield.

The items of information are divided into classes of information, with which different areas of the base display are associated. Accordingly, items of information belonging to a particular class of information are always displayed at the same location on the base display. This has the advantage that an unambiguous display concept is provided, with which passengers can quickly familiarize themselves. Furthermore, due to the large spatial extent of the base display across at least the width of the windshield, large areas of the base display are visible to several, ideally to all vehicle occupants. The items of information may be reproduced on the base display in a suitable size, so that they can be easily read even by vehicle occupants seated in the rear area of the vehicle. Advantageously, the sub-ranges that correspond to different classes of information may be horizontally spaced from each other in order to improve the clarity of the display. This especially allows an unambiguous association of the items of information displayed in a particular sub-area with the associated class of information.

Furthermore, an item of information to be displayed may be assigned to several classes of information. Correspondingly, the information associated in this way is then displayed in all areas that correspond to the classes of information.

Advantageously, the items of information to be displayed are divided into driver-relevant information, passenger-relevant information and/or information of general interest. Accordingly, a particular class of information is assigned to each of the driver relevant information, the passenger relevant information and/or the information of general interest. The driver-relevant information, the passenger related information and/or the information of general interest is reproduced in corresponding spaced-apart sub-areas of the base display. The driver-relevant information is preferably displayed in a region of the base display that is easily visible by the driver of the motor vehicle. The same applies to the reproduction of the passenger-related information in the appropriate sub-area of the base display. The information of general interest is reproduced in a sub-area of the base display that is ideally accessible to all passengers.

Accordingly, in a preferred embodiment of the invention, the driver-relevant information may be displayed in the sub-area of the base display that faces a driver's seat. In particular, the driver-relevant information is displayed in the peripheral field of view of the driver, so that the driver only needs to look away from the traffic for a short time to read the information presented there, thereby minimizing a distraction of the driver while driving. Alternatively or additionally, passenger-relevant information is displayed a sub-area of the base display facing the passenger seat.

In a particularly preferred embodiment, information of general interest is displayed in the area of the base display located between the sub-area facing the vehicle seat and the sub-area of the base display facing the front passenger seat. This area can typically be viewed by passengers seated in a rear area, especially on a rear seat. The information of general interest is reproduced in the appropriate size, so that it can be easily read by the vehicle occupants seated in the back of the vehicle.

For example, a movie or a video clip may be of interest as information to all passengers, and not only to the driver. Preferably, the reproduction occurs on several, at least on two adjacent areas of the base display, in particular in the sub-area provided for displaying passenger-relevant information and in the sub-area provided for information of general interest of the base display. For this purpose, the information corresponding to the movie playback is assigned to the classes of information of passenger-relevant information and information of general interest.

In one exemplary embodiment of the invention, outputs from a navigation system, a vehicle speed, an engine speed, a fuel level, a total mileage and/or a status variable, in particular a vehicle-relevant and/or driving-safety-relevant warning message are reproduced as driver-relevant items of information. Such items of information is typically only of interest to the driver of the motor vehicle.

According to an advantageous exemplary embodiment, outputs from an infotainment system are reproduced as passenger-relevant information. In particular, media data, in particular video clips or movies, may be reproduced in the sub-area of the base display assigned to the passenger. Moreover, pages from the Internet or the Worldwide Web—(WWW) may be reproduced in this sub-area facing the passenger seat.

Preferably, a time, a date, an inside temperature, an ambient temperature of the motor vehicle and/or a trip mileage of the vehicle may be reproduced as information of general interest. This information is typically of interest to all passengers, so that such information of general interest may be reproduced in the central sub-area disposed between the sub-area of the base display assigned to the driver seat and the sub-area assigned to the passenger seat.

It will be understood that the present classification of items of information as driver-relevant information, passenger-relevant information and information of general interest should be construed merely as an example. An arbitrary classification of the items of information into appropriate classes of information may be made when deemed to be useful. Furthermore, the list of examples of items of information to be displayed, such as time, date, etc., is not meant to be limiting. Any other items of information intended for reproduction in the vehicle may be represented in the lower part of the base display corresponding to the class of information associated with the information.

The invention further relates to a vehicle with the base display for reproducing the items of information and a control unit configured for driving the base display. The motor vehicle is designed to carry out the aforedescribed method for reproducing items of information inside the vehicle. The items of information are reproduced in the sub-areas of the base display that correspond to the classes of information of the items of information to be displayed.

BRIEF DESCRIPTION OF THE DRAWING

Further advantages and details of the invention will be described hereinafter with reference to exemplary embodiments and the drawings, which show in.

Mutually corresponding parts are designated in all figures with the same reference symbols.

DETAILED DESCRIPTION OF PREFERRED EMBODIMENTS

Figure 1:
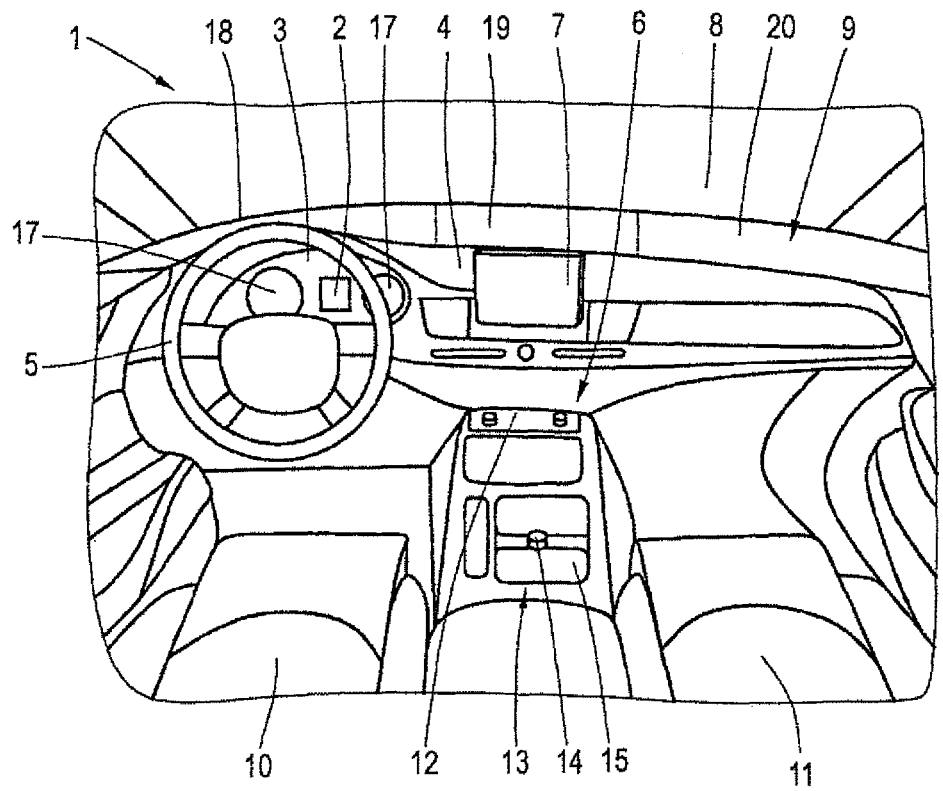
FIG. 1 schematically, a perspective view of a vehicle interior in which a display is arranged at the base of the windshield, FIG. 2 schematically, a motor vehicle with the base display and a control unit driving the base display.

FIG. 1 shows a front region of a vehicle interior of a motor vehicle 1. The exemplary motor vehicle 1 includes a plurality of display units for outputting items of information inside the vehicle. Accordingly, a display 2 is provided in a combination instrument 3 that is integrated in the instrument panel 4 and disposed behind a steering wheel 5. Another display 7, especially for reproducing items of information of an infotainment system or a navigation system of the motor vehicle 1, is provided in the region of a center console 6.

A ribbon-shaped liquid crystal display unit is disposed in the lower area of a windshield 8, referred to as a base display 9. The base display 9 extends at least across the width of the windshield 8 and is thus arranged in the peripheral field of view of a driver seated on a driver seat 10. The items of information displayed on the base display 9 can then also be easily viewed by a passenger seated on a passenger seat 11. Additional components of the infotainment system are arranged in the center console 6. FIG. 1 shows by way of example an audio system 12 of the infotainment system, which can be used to reproduce music titles inside the vehicle.

Input elements 14, 15 of an input unit 13 that are also located in the area of the center console 6 are used to operate information systems and/or assistance systems, such as in particular the infotainment system, a navigation system and/or the like, of the motor vehicle 1 and serve to adapt the items of information reproduced inside the vehicle, wherein the display devices 2, 7, 9 are controlled accordingly. A turn-push-controller 14 is shown as an example which is designed to detect user-side control inputs. In particular, the presentation of the information displayed on the base display 9 is changed depending on the performed control input, wherein base display 9 is driven by a control unit 16 shown in FIG. 2. An additional input element is configured as a touchpad 15 and thus has a touch-sensitive surface. When pressure is applied on the touch-sensitive surface, finger movements from a user, in particular from the driver or the passenger, are detected as signals, which are then supplied to the control unit 16 for controlling the display units 2, 7, 9.

In an alternative embodiment, the touch pad 19 is constructed as an illuminated touch screen that can be easily found, in particular when driving at night.

Figure 2:
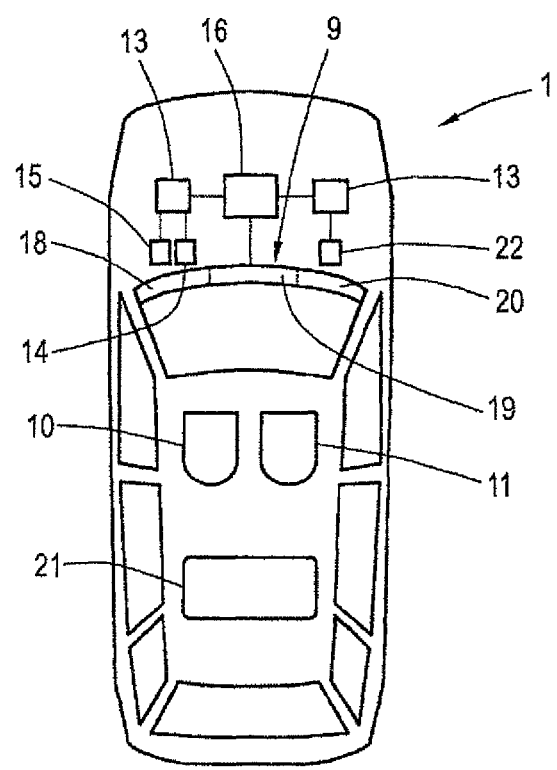

Furthermore, an input unit 13 schematically illustrated in FIG. 2 is provided for speech detection and speech recognition, which is designed to detect voice commands used to control the items of information reproduced inside the vehicle.

The display 2, the base display 9 and the other display 7 are formed as liquid crystal displays (LCD). Analog pointer instruments 17 arranged in the combination instrument 3 are used to display a vehicle speed and an engine speed.

The base display 9 shown in FIG. 1 is divided into three horizontal sub-areas 18, 19, 20 arranged side by side. The sub-areas 18, 19, 20 describe a virtual division of the continuous and ribbon-shaped base display 9 that is not directly discernable. Each sub-area 18, 19, 20 is used to display items of information from a particular category of information. It will be understood that items of information can also be assigned to several categories of information. The illustrated exemplary representation corresponds to a classification of the items of information to be displayed into three categories of information, each including driver-relevant information, passenger-relevant information and information of general interest.

For sake of clarity of the representation, the driver-relevant information is displayed in a first sub-area 18 of the base display 9 arranged directly facing the driver's seat 10. This ensures that at least the driver can easily read the displayed items of information.

The passenger-relevant information is displayed in a second sub-area 20 of the base display 9 arranged facing the passenger seat 11. There, the items of information displayed there can thus be easily perceived at least by the passenger.

Likewise, items of information of general interest are displayed in a third sub-area 19 of the base display 9 disposed between the first sub-area 18 and the second sub-area 20. The items of information displayed in the third sub-area 19 can also be easily read by the vehicle occupants seated in the rear area of the motor vehicle 1. In particular, the items of information displayed in the third sub-area 19 can be perceived by passengers seated on a back seat 21 shown schematically in FIG. 2.

FIG. 2 shows in form of a schematic diagram the motor vehicle 1, which is designed for implementing the method for reproducing items of information. The control unit 16 is configured to selectively drive the sub-areas 18, 19, 20 of the base display 9. In this way, the driver-relevant items of information are reproduced in the first sub-area 18, the passenger-relevant items of information in the second sub-area 20 and the items of information of general interest in the central third sub-area 19. By way of example, the control unit 16 is connected to two input units 13. The base display 9 can then be controlled in response to control inputs captured with the input units 13.

One of the two input units 13 is configured for voice recognition and includes a microphone 22 as an input element. The other of the two exemplary input units 13 includes the turn-push-controller 14 previously shown in FIG. 1 and the touchpad 15.

It will be understood that the exemplary embodiments described herein with reference to the figures are to be construed as merely illustrative and not in any way limiting of the invention. In particular, as a further development of the invention, it is contemplated to replace conventional indication devices and the displays 2, 7, respectively, with the base display 9. Accordingly, the conventional analog pointer instruments 17 can be replaced by reproducing the vehicle speed and the engine speed in the first sub-area 18.

In the illustrated exemplary embodiment, driver-relevant items of information include outputs from a navigation system, the vehicle speed, the engine speed, a fuel level, a total mileage and/or a status variable, in particular a vehicle-relevant and/or driving-safety-relevant warning message. Passenger-relevant items of information are outputs from the infotainment system, in particular channel lists, videos, movies and/or Web pages of the Internet or the Worldwide Web. Items of information of general interest include a time, a date, an inside temperature, an ambient temperature and/or trip mileage of the vehicle.

It will be understood that the exemplary list of items of information is not exhaustive and that, of course, other suitable classifications into individual classes of information can be made.

What is claimed is:

1. A method for reproducing items of information in a motor vehicle, comprising:
    associating classes of information with the items of information, wherein a respective class of information is associated with one of driver-relevant information, passenger-relevant information and information of general interest, and
    reproducing the items of information on a ribbon-shaped base display formed as a liquid crystal display located at a base of a windshield of the motor vehicle,
    wherein a sub-area of the base display is assigned to a respective class of information and the items of information are reproduced in the sub-area that corresponds to the class of information associated with the items of information to be displayed,
    wherein the driver-relevant information is displayed in the sub-area of the base display facing a driver seat,
    wherein the passenger-relevant information is displayed in the sub-area of the base display facing a passenger seat, and
    wherein the information of general interest is displayed in the sub-area of the base display that is located between the sub-area of the base display facing a driver seat and the sub-area of the base display facing a passenger seat.

2. The method of claim 1, wherein different sub-areas that correspond to different classes of information are horizontally spaced apart.

3. The method of claim 1, wherein the driver-relevant information comprises at least one feature selected from outputs from a navigation system, a vehicle speed, an engine speed, a fuel level, a total mileage and a status variable.

4. The method of claim 1, wherein the driver-relevant information comprises a vehicle-relevant or driving-safety-relevant warning message.

5. The method of claim 1, wherein the passenger-relevant information comprises outputs from an infotainment system.

6. The method of claim 1, wherein the information of general interest comprises at least one feature selected from a time, a date, an inside temperature, an ambient temperature and a trip mileage.

7. A motor vehicle, comprising:
    a ribbon-shaped base display formed as a liquid crystal display located at a base of a windshield of the motor vehicle and configured to display items of information on the base display, with the base display being divided into ribbon-shaped sub-areas, wherein a sub-area of the base display is assigned to a respective class of information, and two input units configured to associate classes of information with the items of information, and said input units capturing control inputs to control the base display so as to reproduce the items of information in the sub-area that corresponds to the class of information associated with the items of information to be displayed, wherein the items of information to be displayed are divided into driver-relevant information, passenger-relevant information and/or information of general interest, with a respective class of information being associated with each of the driver-relevant information, the passenger-relevant information and the information of general interest, wherein the driver-relevant information is displayed in the sub-area of the base display facing a driver seat, wherein the passenger-relevant information is displayed in the sub-area of the base display facing a passenger seat, and wherein the information of general interest is displayed in the sub-area of the base display that is located between the sub-area of the base display facing a driver seat and the sub-area of the base display facing a passenger seat.

\* \* \* \* \*

UNITED STATES PATENT AND TRADEMARK OFFICE
CERTIFICATE OF CORRECTION

| | | |
|---|---|---|
| PATENT NO. | : 9,662,978 B2 | Page 1 of 1 |
| APPLICATION NO. | : 14/384344 | |
| DATED | : May 30, 2017 | |
| INVENTOR(S) | : Paul Sprickmann Kerkerinck et al. | |

It is certified that error appears in the above-identified patent and that said Letters Patent is hereby corrected as shown below:

On the Title Page

Under (72) Inventors: please correct the first inventor's (Paul Sprickmann Kerkerinck) last name to read --KERKERINCK--.

In addition, please correct the fifth inventor's (Philip Rigley) city of residence to read --HAMBURG--.

Signed and Sealed this
Twenty-ninth Day of August, 2017

Joseph Matal
*Performing the Functions and Duties of the
Under Secretary of Commerce for Intellectual Property and
Director of the United States Patent and Trademark Office*